(12) United States Patent
Donicke

(10) Patent No.: US 8,466,382 B2
(45) Date of Patent: Jun. 18, 2013

(54) SWITCH ASSEMBLY FOR A STEERING WHEEL

(75) Inventor: Daniel Donicke, Heppenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 12/835,536

(22) Filed: Jul. 13, 2010

(65) Prior Publication Data

US 2011/0011707 A1 Jan. 20, 2011

(30) Foreign Application Priority Data

Jul. 17, 2009 (GB) .................................. 0912426.4

(51) Int. Cl.
*H01H 9/00* (2006.01)

(52) U.S. Cl.
USPC ..................................... 200/61.55; 200/61.54

(58) Field of Classification Search
USPC ...................................................... 200/61.55
See application file for complete search history.

(56) References Cited

U.S. PATENT DOCUMENTS

| 4,368,454 | A |   | 1/1983  | Pilatzki |
|-----------|---|---|---------|----------|
| 4,674,352 | A | * | 6/1987  | Mizuno et al. ............... 74/484 R |
| 4,805,476 | A |   | 2/1989  | Beauch et al. |
| 7,148,437 | B2 | * | 12/2006 | Wahl et al. .................. 200/61.54 |
| 7,527,293 | B1 | * | 5/2009  | Wang ............................ 280/771 |
| 2004/0050673 | A1 |   | 3/2004 | Takahashi et al. |

FOREIGN PATENT DOCUMENTS

| DE | 3513904 A1 | 11/1985 |
| DE | 3913480 A1 | 11/1989 |
| DE | 10117824 A1 | 10/2002 |
| DE | 10156668 A1 | 5/2003 |
| DE | 102004026243 B3 | 1/2006 |
| WO | 2008007177 A2 | 1/2008 |

* cited by examiner

*Primary Examiner* — Renee Luebke
*Assistant Examiner* — Lheiren Mae Caroc
(74) *Attorney, Agent, or Firm* — Ingrassia Fisher & Lorenz, P.C.

(57) ABSTRACT

A switch assembly is provided for a steering wheel. The assembly comprising a steering wheel, a steering wheel hub, a steering column and a switch unit. The switch unit is arranged at the steering wheel hub in such fashion that it may either be operated in the synchronous mode, in which it follows the rotation of the steering wheel when the latter is rotated, or in the fixed mode, in which it remains in a fixed position, even when the steering wheel is rotated.

9 Claims, 4 Drawing Sheets

SWITCH ASSEMBLY FOR A STEERING WHEEL

CROSS-REFERENCE TO RELATED APPLICATION

This application claims priority to British Patent Application No. 0912426.4, filed Jul. 17, 2009, which is incorporated herein by reference in its entirety.

TECHNICAL FIELD

The invention relates to a switch assembly for a steering wheel.

BACKGROUND

From U.S. Pat. No. 4,805,476 a gear switch assembly is known that is arranged at the steering column of a vehicle in such manner that it remains in a fixed position, even when the steering wheel is rotated. For operating the gear switch, a driver is forced to unclasp the steering wheel, which may, under certain conditions, result in a loss of control over the vehicle.

From DE10156668 a gear switch unit arranged on a steering wheel is known. The switch unit comprises switches which are arranged, with respect to the steering wheel, in such way that they follow the rotation of the steering wheel when the latter is rotated, e.g., for driving the vehicle on a curved road. This means that the driver of the vehicle, whose hands rest on the steering wheel, can operate the gear switches without unclasping the latter.

It is a disadvantage of such kind of a gear switch assembly that the driver may be forced to operate the switch when the latter adopts an angle of rotation in which the driver may lose orientation. This may for example be the case when the steering wheel adopts an angle of rotation of 180°, because then an "up" switch will direct downwards, and a "down" switch will direct upwards, thus confusing the driver which switch to operate. Furthermore, under such conditions a switch may be difficult to operate because a strong bending of the driver's hand may be required.

In view of the foregoing, it is at least one object of the invention to provide a switch assembly for a steering wheel which avoids the disadvantages of the prior art. Furthermore, other objects, desirable features, and characteristics will become apparent from the subsequent summary and detailed description, and the appended claims, taken in conjunction with the accompanying drawings and this background.

SUMMARY

At least one solution of the at least one object, other objects, desirable features, and characteristics is achieved by a switch assembly for a steering wheel. The assembly comprising a steering wheel, a steering wheel hub, a steering column and a switch unit. The switch unit is arranged at the steering wheel hub in such fashion that it may either be operated in the synchronous mode, in which it follows the rotation of the steering wheel when the latter is rotated, or in the fixed mode, in which it remains in a fixed position, even when the steering wheel is rotated.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any theory presented in the preceding background or summary or the following detailed description.

Figure 1:
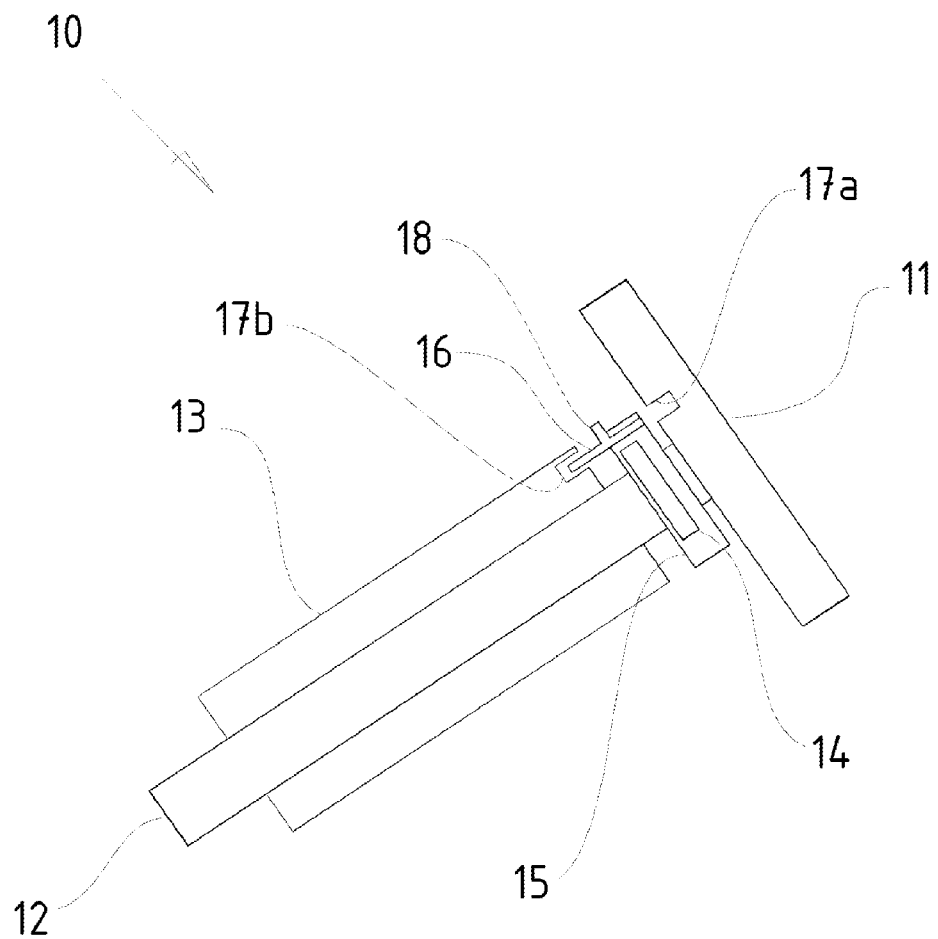
FIG. 1 is a schematic cross section of a first embodiment of the invention which is in the synchronous mode.

The switch assembly 10 shown in FIG. 1, which is, in a preferred embodiment, a gear switch assembly, is shown in the fixed mode, in which it remains in a fixed position, even when the steering wheel is rotated.

The switch assembly 10 comprises a steering wheel 11, a steering wheel hub 12, a steering column 13 and a switch unit 14. The switch unit comprises a freewheel assembly 15 arranged at the steering wheel hub, which allows to dispose the switch unit in the area of the steering wheel hub without attaching it to the latter in a fixed fashion, which would mean that it would always follow the rotation angle of the latter. In the simplest of embodiments, the said freewheel assembly comprises a borehole which serves as a duct for the steering wheel hub. In more sophisticated embodiment, the freewheel assembly may moreover comprise at least one journal coaxially disposed on the steering wheel hub.

It is important to mention that the switch unit and the freewheel assembly may form one integral part. The freewheel assembly comprises a driver pin 16 which is introduced into the receptacle 17a arranged in the steering column. This means that the switching unit remains in a fixed position, even when the steering wheel is rotated. Furthermore, the switch assembly comprises an actuator 18 for shifting the driver pin and thus switching between the "synchronous mode" and the "fixed mode". Said driver pin can for example be supported by a spring.

Figure 2:
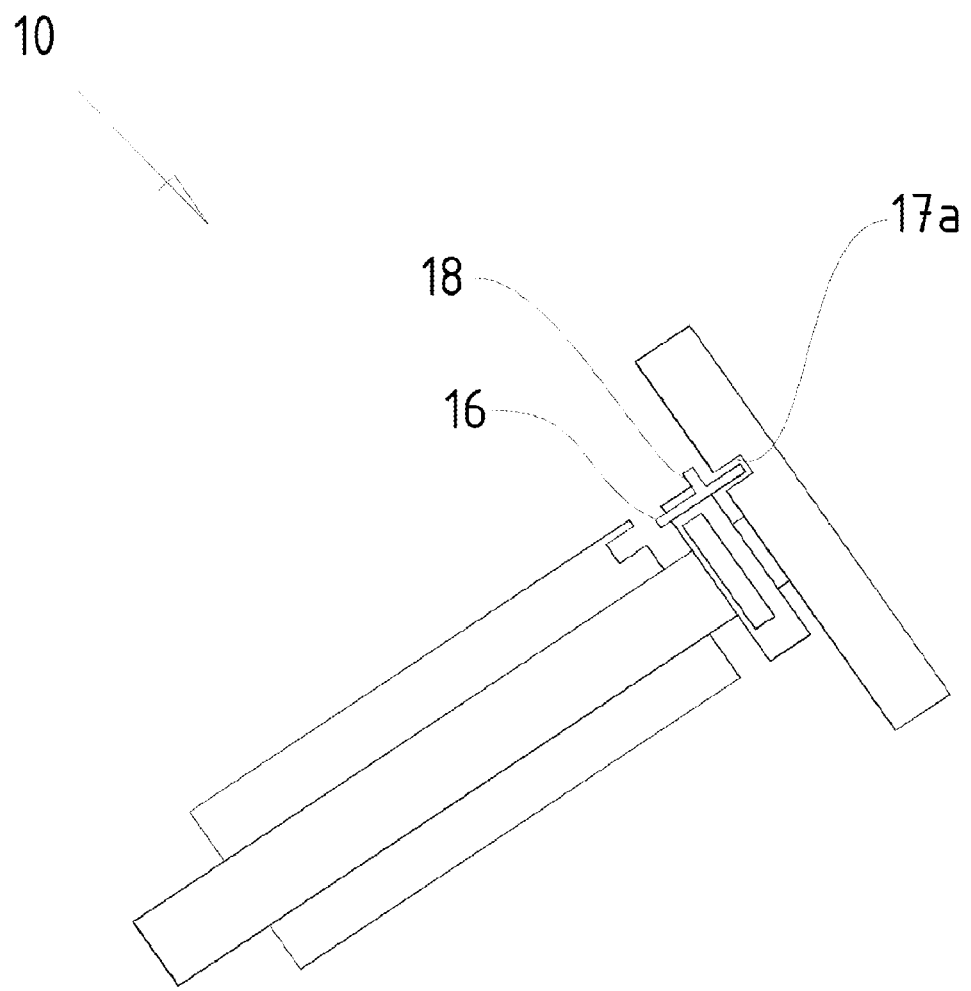
FIG. 2 is a schematic cross section of a first embodiment of the invention which is in the fixed mode.

FIG. 2 shows the same switch assembly 20, which is now in the synchronous mode. Therefore, the driver pin 16 is introduced into the receptacle 17 b arranged in the steering wheel. This means that the switching unit follows the rotation of the steering wheel when the latter is rotated.

It may, in a preferred embodiment, be provided that switching between the "synchronous mode" and the "fixed mode" is only possible when the steering wheel adopts a rotation angle in which the front wheels are arranged in a straight-ahead position.

In such position, it may be provided that said at least one driver pin and the said at least two receptacles arranged in the steering wheel and the steering column, respectively, are aligned with one another.

In one embodiment, the said actuator is merely a handle which allows shifting up, and down, the driver pin and thus switching between the "synchronous mode" and the "fixed mode". In another embodiment, said actuator is a button switch, which, upon actuation. In another embodiment, said actuator can also comprise two button switches connected to one another in a toggle mode, for switching between the "synchronous mode" and the "fixed mode". In yet another embodiment, said actuator can also comprise an electromechanical unit for switching between the "synchronous mode" and the "fixed mode".

Figure 3:
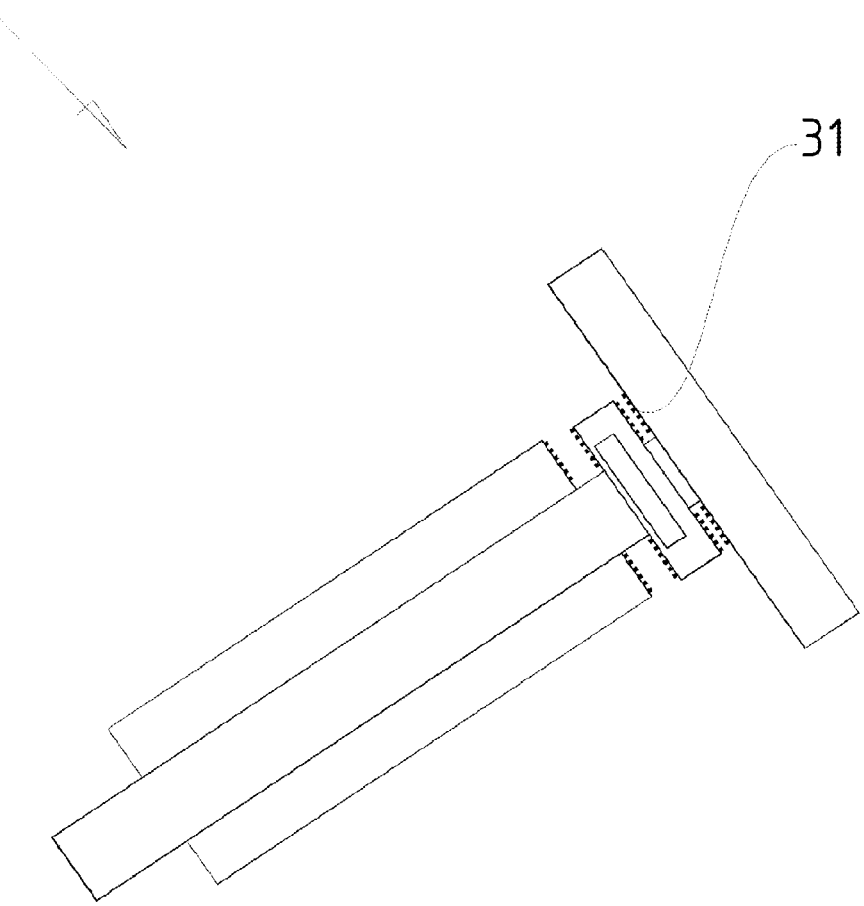
FIG. 3 is a schematic cross section of a second embodiment of the invention.

FIG. 3 shows, in another embodiment, a switch assembly 30, which has friction plates 31 disposed at the freewheel assembly, the steering wheel and the steering column, and which likewise allow an operation in either the synchronous mode or the fixed mode, by merely shifting the freewheel assembly upwards or downwards in a direction coaxially to the steering wheel hub.

Figure 4:
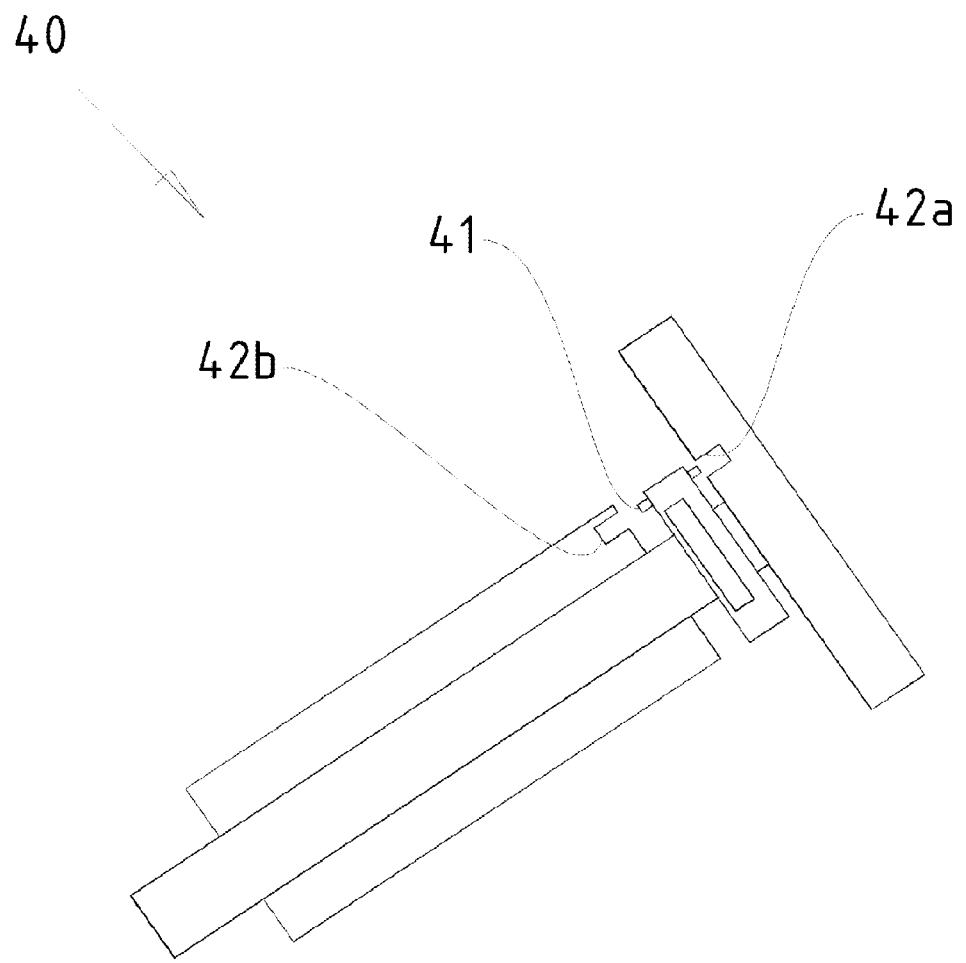
FIG. 4 is a schematic cross section of a third embodiment of the invention.

FIG. 4 shows, in another embodiment, a switch assembly 40, which has two nuts 41 disposed at the freewheel assembly, and two respective grooves 42 *a*, 42 *b* disposed at the steering wheel and the steering column, respectively. This arrangement allows an operation in either the synchronous mode or the fixed mode, by merely shifting the freewheel assembly upwards or downwards in a direction coaxially to the steering wheel hub.

It is obvious that from this teaching the skilled person may find other embodiments to realize the teaching of the present invention without applying additional inventive activity. These embodiments are still under the scope of the present claims.

According to a preferred embodiment of the present invention, the switch unit is at least one selected from the group of gear switch unit, automatic transmission switch unit, direction indicator switch unit, vehicle lighting switch unit, and/or windscreen wiper switch unit.

In case the switch unit is a gear switch unit, it will preferably be combined with an automatic clutch. Quite often, such clutch allows for a sequential gear shift process. In another preferred embodiment of the present invention. the switch unit comprises at least one rocker switch. Such rocker switch may combine both an "up" switch functionality and a "down" switch functionality, and may in this embodiment be used in connection with a sequential gear switch, i.e. operating the "up" switch functionality the user may select a higher gear, and by operating the "down" switch functionality the user may select a lower gear.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A switch assembly for a steering wheel, comprising:
   a steering wheel hub;
   a steering column; and
   a switch unit arranged at the steering wheel hub in such fashion that it may either be operated in a synchronous mode or a fixed mode,
   wherein the synchronous mode follows a rotation of the steering wheel when the latter is rotated and the fixed mode remains in a fixed position, even when the steering wheel is rotated,
   the switch unit comprises a freewheel assembly arranged at the steering wheel hub, and
   the freewheel assembly comprises at least one driver pin that can be introduced, in an alternating fashion, in either of at least two receptacles, the latter being arranged in the steering wheel or the steering wheel hub, and in the steering column, respectively.

2. The switch assembly according to claim 1, wherein the switch assembly further comprises an actuator for switching between the synchronous mode and the fixed mode.

3. The switch assembly according to claim 1, wherein it is provided that switching between the synchronous mode and the fixed mode is only possible when the steering wheel adopts a rotation angle in which a front wheel is arranged in a straight-ahead position.

4. The switch assembly according to claim 1, wherein the switch unit is a gear switch unit.

5. The switch assembly according to claim 1, wherein the switch unit is automatic transmission switch unit.

6. The switch assembly according to claim 1, wherein the switch unit is a direction indicator switch unit.

7. The switch assembly according to claim 1, wherein the switch unit is a vehicle lighting switch unit.

8. The switch assembly according to claim 1, wherein the switch unit is a windscreen wiper switch unit.

9. The switch assembly according to claim 1, wherein the switch unit comprises at least one rocker switch.

\* \* \* \* \*